(12) United States Patent
Guo et al.

(10) Patent No.: US 11,399,124 B2
(45) Date of Patent: Jul. 26, 2022

(54) POSITIONING APPARATUS, CAMERA MODULE, AND MOBILE TERMINAL

(71) Applicant: HUAWEI TECHNOLOGIES CO., LTD., Guangdong (CN)

(72) Inventors: Wenping Guo, Shenzhen (CN); Qiang Huang, Shenzhen (CN); Gaofeng Peng, Dongguan (CN); Yan Wang, Beijing (CN); Xi Wang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/972,102

(22) PCT Filed: Jun. 7, 2018

(86) PCT No.: PCT/CN2018/090282
§ 371 (c)(1),
(2) Date: Dec. 4, 2020

(87) PCT Pub. No.: WO2019/232751
PCT Pub. Date: Dec. 12, 2019

(65) Prior Publication Data
US 2021/0227112 A1    Jul. 22, 2021

(51) Int. Cl.
*H04N 5/225* (2006.01)
*G06F 1/16* (2006.01)

(52) U.S. Cl.
CPC .......... *H04N 5/2257* (2013.01); *G06F 1/1686* (2013.01); *H04N 5/2252* (2013.01)

(58) Field of Classification Search
CPC .. H04N 5/2257; H04N 5/2258; H04M 1/0264
USPC ................................................ 348/373, 376
See application file for complete search history.

(56) References Cited

U.S. PATENT DOCUMENTS

| | | | | |
|---|---|---|---|---|
| 10,165,161 | B2* | 12/2018 | Wei | .................. G06F 1/1658 |
| 2008/0174692 | A1 | 7/2008 | Kusaki et al. | |
| 2008/0311782 | A1* | 12/2008 | Nishio | ............... H01R 12/7076 439/357 |
| 2010/0203747 | A1* | 8/2010 | Hu | ..................... H01R 12/7076 439/77 |
| 2010/0309323 | A1 | 12/2010 | Shin et al. | |
| 2019/0041909 | A1* | 2/2019 | Pakula | ................ H04M 1/0202 |
| 2020/0348823 | A1* | 11/2020 | Cheng | ................. H04M 1/0264 |
| 2021/0127532 | A1* | 4/2021 | Persson | ................. H04N 5/2257 |

FOREIGN PATENT DOCUMENTS

| | | |
|---|---|---|
| CN | 101170646 A | 4/2008 |
| CN | 201314966 Y | 9/2009 |
| CN | 101909155 A | 12/2010 |

(Continued)

*Primary Examiner* — Anthony J Daniels
(74) *Attorney, Agent, or Firm* — Womble Bond Dickinson (US) LLP

(57) ABSTRACT

A positioning apparatus includes a body, the body has a positioning slot used to accommodate a camera, and elastic elements are separately fastened to two side walls adjacent to the positioning slot. The positioning apparatus further includes a cover plate, and the cover plate is detachably fastened to the body. When the camera is installed in the positioning slot, two elastic elements separately press against a housing of the camera. The cover plate presses against an end face of the camera.

20 Claims, 6 Drawing Sheets

(56) References Cited

FOREIGN PATENT DOCUMENTS

| | | | | |
|---|---|---|---|---|
| CN | 102157816 | A | 8/2011 | |
| CN | 206039002 | U | 3/2017 | |
| CN | 107765392 | A | 3/2018 | |
| CN | 110278363 | A * | 9/2019 | ........... H04N 5/2251 |
| EP | 2575214 | A1 | 4/2013 | |
| JP | 3148563 | U | 2/2009 | |

* cited by examiner

POSITIONING APPARATUS, CAMERA MODULE, AND MOBILE TERMINAL

CROSS-REFERENCE TO RELATED APPLICATIONS

This application is a national stage of international application no. PCT/CN2018/090282, filed on Jun. 7, 2018, which is hereby incorporated by reference in its entirety.

TECHNICAL FIELD

This application relates to the field of mobile terminal technologies, and in particular, to a positioning apparatus, a camera module, and a mobile terminal.

BACKGROUND

A camera module using dual/multi-camera is increasingly applied to a mobile terminal due to good image quality and performance that cannot be achieved by a single camera. However, to ensure imaging quality, the camera module has a high requirement on a position degree between cameras and reliability and stability of an entire system. There is a gap between the camera and a positioning apparatus due to process tolerance and operation space that needs to be reserved during installation. As a result, the camera has a specific offset and rotation in the positioning apparatus, which enlarges a change range of the position degree, increases the gap after being affected by disturbance factors such as external force, and further affects the position degree.

In an existing manner of installing a camera, a manner of manually placing the camera into the positioning apparatus in a square shape or a dining box shape is usually used, or a manner of using a mechanical hand to clamp multi-camera into a specific position after a position of the positioning apparatus is identified based on optics. However, in the manual placement manner, positioning precision is low, and a proportion of defects is high. The mechanical hand has low efficiency and high costs. However, to meet positioning precision and reliability, after the cameras are assembled to the positioning apparatus in the foregoing two manners, the position degree between the cameras needs to be adjusted to an indicator range by using a jig, and then the cameras are fastened to the positioning apparatus by using an adhesive (a dispensing manner is usually used). In this way, a relative position between the cameras is fixed. However, on one hand, because the adhesive occupies a certain thickness, bonding reliability is poor, and positioning of the camera is poor, the camera moves upward in its axis, and there is a risk of tilting and deviation. On the other hand, a special jig and a fastening device need to be used during assembly, the assembly is complex, and the camera is difficult to separate after being fastened to the positioning apparatus by using the adhesive, and cannot be corrected. This is not conducive to assembly of another component and subsequent replacement and maintenance, and increases production and maintenance costs of the camera module.

SUMMARY

This application provides a positioning apparatus, a camera module, and a mobile terminal, to improve precision of positioning a camera by a positioning apparatus.

According to a first aspect, this application provides a positioning apparatus. The positioning apparatus includes a body, and the body has a positioning slot. In addition, when the positioning slot is disposed, the positioning slot is dented in an axial direction of a camera to accommodate the camera. Elastic elements are separately fastened to two side walls adjacent to the positioning slot, and the elastic element cooperates with the positioning slot to limit movement of the camera in a direction perpendicular to the side wall on which the elastic element is located. In addition, the positioning apparatus further includes a cover plate. The cover plate is detachably fastened to the body, and the cover plate cooperates with the positioning slot to limit movement of the camera in the axial direction of the camera. When the camera is disposed in the positioning apparatus, two elastic elements separately press against a housing of the camera, and the cover plate presses against an end face of the camera, to eliminate a gap that is between the camera and the positioning apparatus and that is caused by a tolerance. In the foregoing technical solution, when the camera is assembled to the positioning apparatus, the camera is locked in the positioning slot through cooperation between the elastic element and the positioning slot and cooperation between the cover plate and the positioning slot. When the camera is impacted, the camera is quickly reset under an action of the elastic element, to further improve precision of positioning the camera by the positioning apparatus. In addition, when a plurality of cameras are installed in the positioning apparatus, there is no gap between each camera and a positioning slot accommodating the camera. Therefore, a relative position between the cameras is completely determined. This avoids a relative position fluctuation caused by the gap.

In an embodiment, to improve positioning precision and eliminate a gap that is between the camera and the positioning apparatus and that is caused by a tolerance, specifically, each elastic element includes an elastic position-limiting part and a connection part that are integrated as a whole, the elastic position-limiting part is located in the positioning slot, and the connection part is fastened to a side wall of the positioning slot. The elastic position-limiting part is fastened in the positioning slot by using the connection part. In this way, when the camera is disposed in the positioning slot, the two elastic elements better press against the housing of the camera, to further improve precision of positioning the camera by the positioning apparatus.

In an embodiment, the elastic position-limiting part includes two spring sheets, one end of each spring sheet is connected to the connection part, and the other end of each spring sheet extends into the positioning slot. In this way, on a basis of ensuring positioning precision, it is convenient for the camera to be installed into the positioning slot in the axial direction from a top of the positioning slot.

In an embodiment, a clamping slot is disposed on the connection part, and a protrusion clamped with the clamping slot is disposed on the side wall of the positioning slot. On the basis of ensuring positioning precision, the clamping slot is clamped with the protrusion, and the elastic element and the positioning slot can be relatively quickly installed and removed.

In an embodiment, the connection part is bonded or welded to the side wall of the positioning slot. On the basis of ensuring the positioning precision, a bonding or welding function between the connection part and the positioning slot can ensure fastening strengths of the connection part and the positioning slot.

In an embodiment, to improve positioning precision and eliminate a gap that is between the camera and the positioning apparatus and that is caused by a tolerance, specifically, a positioning bar is disposed on the side wall that is in the positioning slot and that is opposite to each elastic element. When the camera is installed in the positioning slot, the elastic element and a corresponding positioning bar separately press against a side wall opposite to the camera. The elastic element and a corresponding positioning bar of the elastic element press against the camera, and a gap that is between the camera and the positioning apparatus and that is caused by a tolerance can be further eliminated, to further improve precision of positioning the camera by the positioning apparatus.

In an embodiment, to improve positioning precision, specifically, the body includes a metal support and a plastic support that is formed on the metal support through insert injection molding, and the metal support and the plastic support form the positioning slot. The plastic support is processed through one-time injection molding on the metal support, to ensure position precision of a plurality of positioning slots on the body and position precision between the positioning slots.

In an embodiment, the metal support includes a bottom plate and a side plate, and the elastic element is fastened to the side plate. To facilitate installation, removal, and replacement of a component, the cover plate is detachably fastened to an outer surface of the side plate, and the cover plate may be bonded or welded to the outer surface of the side plate. The cover plate and the metal support are processed through one-time stamping, and the cover plate and the side plate of the metal support are bonded or welded, to ensure position precision of a plurality of positioning slots on the body and position precision between the positioning slots in an axial direction of the camera.

In an embodiment, when there is the positioning bar in the positioning slot, the positioning bar is formed on a side wall of the plastic support, to facilitate processing and manufacturing, and reduce damage caused by the positioning bar to the camera.

In an embodiment, the elastic element is prepared by using a conductive material, to implement that the camera is grounded.

In an embodiment, the elastic element is prepared by using a stainless steel material. The elastic element may also be prepared by using another material having both elastic and conductive properties.

According to a second aspect, this application provides a camera module. The camera module includes the positioning apparatus according to any one of the foregoing implementations, and the camera disposed in the positioning slot. When the camera is assembled to the positioning apparatus, the camera is locked in the positioning slot by pressing an elastic element against a housing of the camera and pressing a cover plate against an end face of the camera, to eliminate a gap that is between the camera and the positioning apparatus and that is caused by a tolerance, and further improve precision of positioning the camera by the positioning apparatus. In addition, when being impacted, the camera is rapidly reset under an action of the elastic element, to improve reliability of the camera module.

According to a third aspect, this application further provides a mobile terminal. The mobile terminal includes a housing and the foregoing camera module disposed in the housing. An elastic element and a cover plate are disposed to improve positioning precision of the positioning apparatus for the camera, to ensure position precision and reliability of the camera module.

DESCRIPTION OF EMBODIMENTS

To make the objectives, technical solutions, and advantages of the present invention clearer, the following further describes the present invention in detail with reference to the accompanying drawings.

In the prior art, a camera module of a mobile terminal gradually evolves to multi-camera, and a positioning apparatus in the mobile terminal uses a glue dispensing manner to provide a relatively fixed position of the multi-camera. As a result, positioning precision is low. To improve the positioning precision, an embodiment of this application provides a camera module. In the camera module, a positioning apparatus positions a camera. The camera module may be a single-camera module. In this case, the positioning apparatus includes one positioning slot. Alternatively, the camera module may be a multi-camera module. In this case, the positioning apparatus includes a plurality of positioning slots. An embodiment of this application provides a positioning apparatus, and a structure of the positioning apparatus is improved, to improve precision of positioning the camera by the positioning apparatus. The positioning precision mentioned in this embodiment of this application includes positioning precision between a positioning slot and the camera disposed in the positioning slot, or the positioning precision in the multi-camera module further includes relative position degrees between a plurality of cameras.

For ease of description, a camera module having two cameras is used as an example for description in this embodiment of this application. A positioning principle of a camera in the multi-camera module having more than two cameras is similar to that of the camera module having two cameras.

Figure 1:
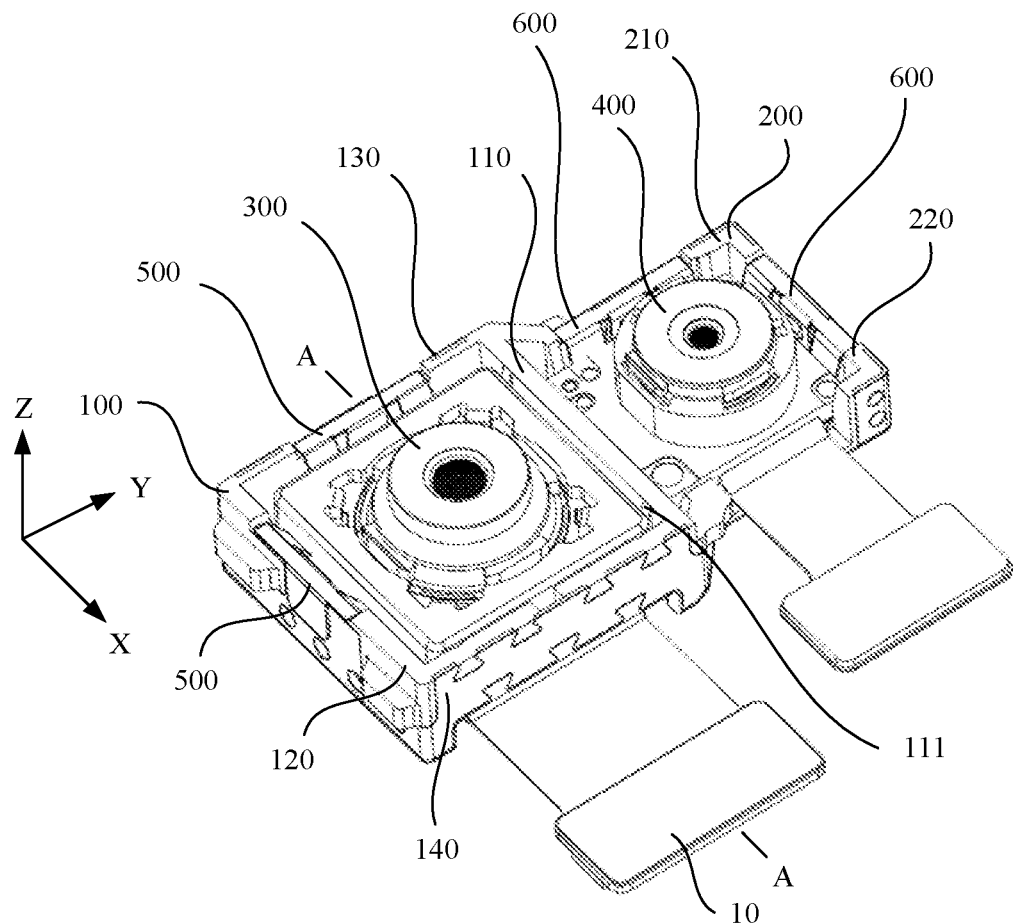
FIG. 1 is a schematic structural diagram of a camera module according to an embodiment of this application.
Figure 2:
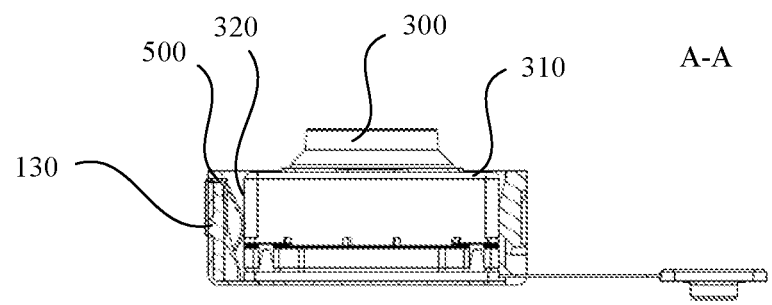
FIG. 2 is a sectional view of a camera module according to an embodiment of this application.

For ease of describing a structure of a camera and a positioning apparatus in a camera module and a relative position of the camera and the positioning apparatus in the camera module provided in this embodiment of this application, FIG. 1 shows a partial structure of the camera module, and FIG. 2 shows an internal structure of a section in an A-A direction in FIG. 1. First, directions of the camera module are separately set as an X direction, a Y direction, and a Z direction. The X direction is an arrangement direction along which a camera 500 and a flexible circuit board 10 connected to the camera 500 are arranged, the Y direction is an arrangement direction along which a camera 300 and a camera 400 are arranged, and the Z direction is an axial direction of the camera 300. In addition, an end face 310 and a housing 320 of the camera 300 are defined. The housing 320 is a housing that is on the camera 300 and that wraps a lens. The housing 320 is accommodated in the positioning slot 100. The end face 310 is a plane that is on the camera 300 and that is parallel to the lens and that is close to the positioning slot 100.

Figure 3:
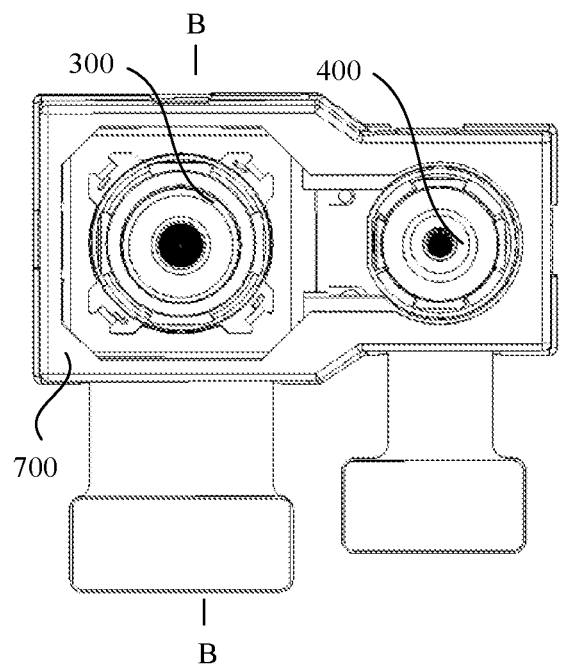
FIG. 3 is a schematic structural diagram of a camera module according to an embodiment of this application.
Figure 4:
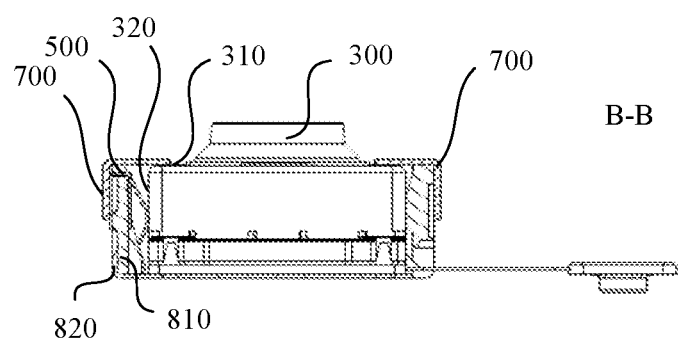
FIG. 4 is a sectional view of a camera module according to an embodiment of this application.

FIG. 1 shows a structure in which an elastic element cooperates with the camera in the positioning slot. FIG. 2 shows a structure in which the elastic element presses against the housing of the camera. FIG. 3 shows a structure of the camera module. FIG. 4 is a sectional view in a B-B direction in FIG. 3. It can be seen from FIG. 1 and FIG. 2 that the positioning apparatus includes a body, and the body has a positioning slot 100 and a positioning slot 200. The positioning slot 100 and the positioning slot 200 are connected by using a common side wall 110, and the positioning slot 100 and the positioning slot 200 are dented in the axial direction of the camera 300. The camera 300 is installed in the positioning slot 100 in the Z direction, and the camera 400 is installed in the positioning slot 200 in the Z direction. An elastic element 500 is fastened to a side wall 120 of the positioning slot 100, and an elastic element 500 is fastened to a side wall 130 adjacent to the side wall 120. No elastic element is disposed on a side wall 130 and a side wall 140 of the positioning slot 100. In other words, only two elastic elements are disposed on each positioning slot. An elastic element 600 is fastened to a side wall 210 of the positioning slot 200, and an elastic element 600 is fastened to a side wall 220 adjacent to the side wall 210. It can be seen from FIG. 1 and FIG. 2 that when the camera 300 is assembled to the positioning apparatus, the camera 300 is located in the positioning slot 100. Two elastic elements 500 separately press against the housing 320 of the camera 300. In this case, the elastic element 500 located on the side wall 120 cooperates with the side wall 110 to limit movement of the camera 300 in the Y direction. In other words, the camera 300 is fastened in the Y direction, to eliminate a gap that is between the camera 300 and the positioning slot 100 and that is caused by a tolerance in the Y direction. The elastic element 500 located on the side wall 130 cooperates with the side wall 140 to limit movement of the camera 300 in the X direction. In other words, the camera 300 is fastened in the X direction, to eliminate a gap that is between the camera 300 and the positioning slot 100 and that is caused by a tolerance in the X direction. This improves positioning precision, and eliminates the gap that is between the camera 300 and the positioning slot 100 and that is caused by a tolerance.

It can be seen from FIG. 3 and FIG. 4 that the positioning apparatus further includes a cover plate 700. The cover plate 700 is detachably fastened to the body. When the camera 300 and the camera 400 are assembled to the positioning apparatus, the cover plate 700 presses against the end face 310 of the camera 300 and an end face of the camera 400. It can be seen from FIG. 4 that the cover plate 700 cooperates with the positioning slot 100 to limit movement of the camera 300 in the Z direction. In other words, the camera 300 is fastened in the Z direction, to eliminate the gap that is between the camera 300 and the positioning slot 100 in the Z direction and that is caused by a tolerance, and improve positioning precision. Further, when the camera 300 is assembled to the positioning apparatus, the camera 300 is locked in the positioning slot 100 through cooperation between the elastic element 500 and the positioning slot 100 and cooperation between the cover plate 700 and the positioning slot 100. Similarly, when the camera 400 is assembled to the positioning apparatus, the camera 400 is locked in the positioning slot 200 through cooperation between the elastic element 600 and the positioning slot 200 and cooperation between the cover plate 700 and the positioning slot 200.

In addition, when being impacted, the camera 300 can be quickly reset under an action of the elastic element 500. For example, when the camera 300 is subjected to action force in the Y direction toward the side wall 120, the elastic element 500 is pressed again. Because the elastic element 500 can avoid direct contact between the camera 300 and the side wall 120 of the positioning slot 100, to reduce damage to the camera 300, and action force of the elastic element 500 can lessen an effect of movement of the camera 300, after the action force disappears, pressure of the elastic element 500 is released, to push the camera 300 to move toward the side wall 110, and finally return to a position before being impacted. Therefore, the elastic element 500 plays an effect lessening and resetting function for the camera 300, to ensure that the positioning apparatus positions the camera 300. Similarly, the elastic element 600 plays an effect lessening and resetting function for the camera 400, to ensure that the positioning apparatus positions the camera 300, improve precision of positioning the camera by the positioning apparatus, and improve reliability and stability of fixed installation of the camera 300 and the camera 400 by the positioning apparatus.

Therefore, there is no gap between the camera 300 and the positioning slot 100 and between the camera 400 and the positioning slot 200 when the camera 300 and the camera 400 are in a normal state and under impact. In other words, the camera 300, the camera 400, and the positioning apparatus are relatively fastened. In this way, a relative position between the camera 300 and the camera 400 are completely determined. This avoids a relative position fluctuation caused by the gap and has good positioning precision, reliability, and stability.

Figure 5:
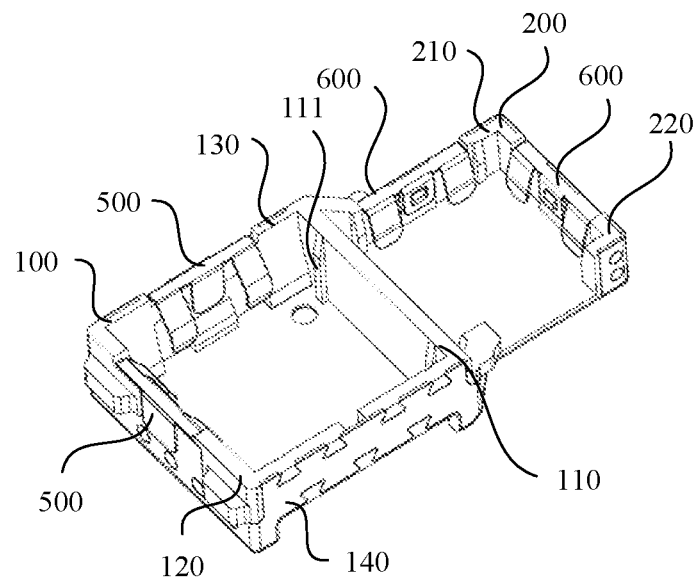
FIG. 5 is a schematic structural diagram of a positioning apparatus according to an embodiment of this application.
Figure 6:
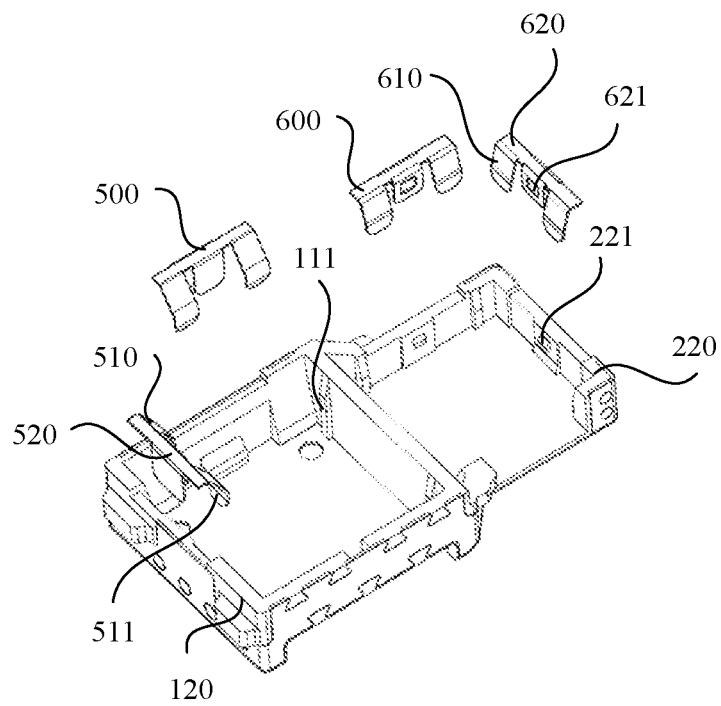
FIG. 6 is a schematic exploded diagram of a positioning apparatus according to an embodiment of this application.

To improve positioning precision and eliminate a gap that is between the camera and the positioning apparatus and that is caused by a tolerance. FIG. 5 shows a structure in which an elastic element in the positioning slot cooperates with the positioning slot. FIG. 6 shows structures of the elastic element and the positioning slot. The elastic element 500 provided in this embodiment of this application includes an elastic position-limiting part 510 and a connection part 520 that are integrated as a whole. Elastic position-limiting parts 510 of the two elastic elements 500 are located in the positioning slot 100. The connection part 520 of one elastic element 500 is fastened to the side wall 120 of the positioning slot 100, and the connection part 520 of the other elastic element 500 is fastened to the side wall 130 of the positioning slot 100. It can be seen from FIG. 5 and FIG. 6 that, before the camera 300 is assembled to the positioning slot 100, the elastic position-limiting part 510 is in a free state. It can be seen from FIG. 1 and FIG. 2 that, after the camera 300 is assembled to the positioning slot 100, the elastic position-limiting part 510 changes to a compressed state. It can be seen from FIG. 2 that, pressure of the elastic position-limiting part 510 on the side wall 130 enables the camera 300 to be closely attached to the side wall 140 of the positioning slot 100. In other words, the elastic element 500 presses against the housing 320 of the camera 300 under pressure of the elastic element 500, to eliminate a gap that is between the camera 300 and the positioning slot 100 and that is caused by a tolerance in the X direction.

For the elastic position-limiting part 510, referring to FIG. 5 and FIG. 6, FIG. 5 shows a structure of the elastic element in the positioning slot, and FIG. 6 shows a specific structure of the elastic position-limiting part. During specific disposition, the elastic position-limiting part 510 includes two spring sheets 511. One end of each spring sheet 511 is connected to the connection part 520, and the other end of each spring sheet 511 extends into the positioning slot 100. In this way, the camera 300 is conveniently installed in the positioning slot 100 in the Z direction above the positioning slot 100 while positioning precision is ensured.

Figure 7:
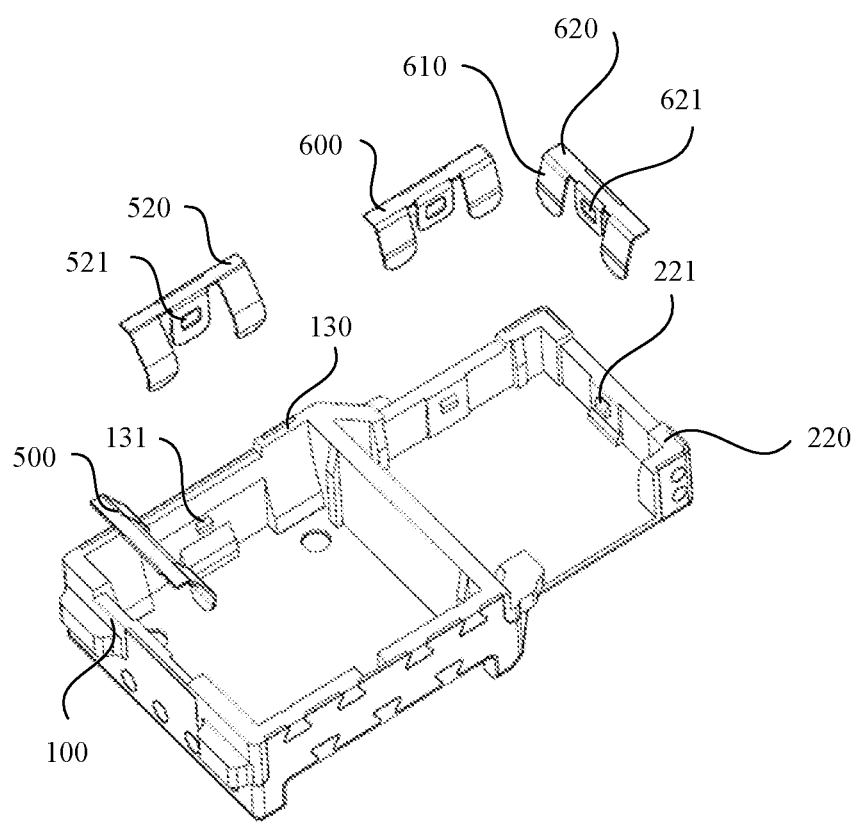
FIG. 7 is a schematic exploded diagram of a positioning apparatus according to an embodiment of this application.
Figure 8:
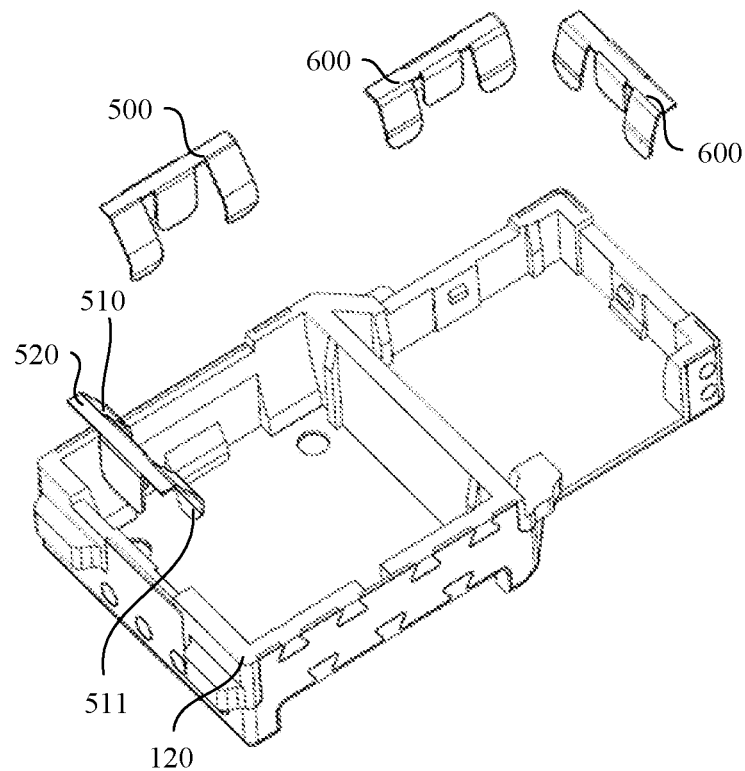
FIG. 8 is a schematic exploded diagram of a positioning apparatus according to an embodiment of this application.

For the connection part 520 and a connection part 620, FIG. 5 shows a structure of the elastic element in the positioning slot, and FIG. 6, FIG. 7, and FIG. 8 show specific structures of the connection part 520 or the connection part 620. It can be seen from FIG. 6 that a clamping slot 621 is disposed on the connection part 620 of the elastic element 600, and a protrusion 221 clamped with the clamping slot 621 is disposed on the side wall 220 of the positioning slot 200. The clamping slot 621 is clamped with the protrusion 221, so that the elastic element 600 and the positioning slot 200 can be quickly installed and removed. In addition, when the elastic element 600 needs to be replaced, the clamping slot 621 is clamped with the protrusion 221, so that the elastic element 600 can be replaced. This greatly reduces production and maintenance costs. Referring to FIG. 5 and FIG. 6, the connection part 520 is bonded or welded to the side wall 120 of the positioning slot 100. A bonding or welding function can ensure, on a basis of ensuring positioning precision, a fastening strength of the connection part 520 fastened to the side wall 120. It can be seen from FIG. 5 and FIG. 6 that, in a positioning apparatus, two elastic elements 500 and two elastic elements 600 use different structural forms. In other words, in the positioning apparatus, the elastic element may be connected to the positioning slot in two connection manners. It can be seen from FIG. 7 and FIG. 8 that, in the positioning apparatus, the two elastic elements 500 and the two elastic elements 600 use a same structure form. In other words, a same connection manner may be used in one positioning apparatus to connect the elastic element and the positioning slot. In addition, the structure form of the connection part may be the foregoing form and may be another arrangement form.

It can be seen from FIG. 7 that, a clamping slot 521 is disposed on the connection part 520, a protrusion 131 is disposed on the side wall 130 of the positioning slot 100, and the clamping slot 521 is clamped with the protrusion 131. A clamping slot 621 is disposed on the connection part 620, a protrusion 221 clamped with the clamping slot 621 is disposed on the side wall 220 of the positioning slot 200, and the clamping slot 621 is clamped with the protrusion 221. It can be seen from FIG. 8 that the connection part 520 is bonded or welded to the side wall 120 of the positioning slot 100, and the connection part 620 is bonded or welded to the side wall 220 of the positioning slot 200.

In addition, a fastening manner of the connection part and the positioning slot is not limited to the foregoing clamping connection, bonding, and welding manners, and may further include another fastening manner. In addition, a fastening position such as the clamping connection, the bonding, and the welding is not limited to a form of being located in the positioning slot in this embodiment of this application. Alternatively, the fastening position may be disposed on an outer surface of the positioning slot, or may be disposed at a bottom of the positioning slot. When the connection part is disposed at the bottom of the slot, a fastening manner of the connection part and the positioning slot needs to be selected based on a specific size of the camera module.

Figure 9:
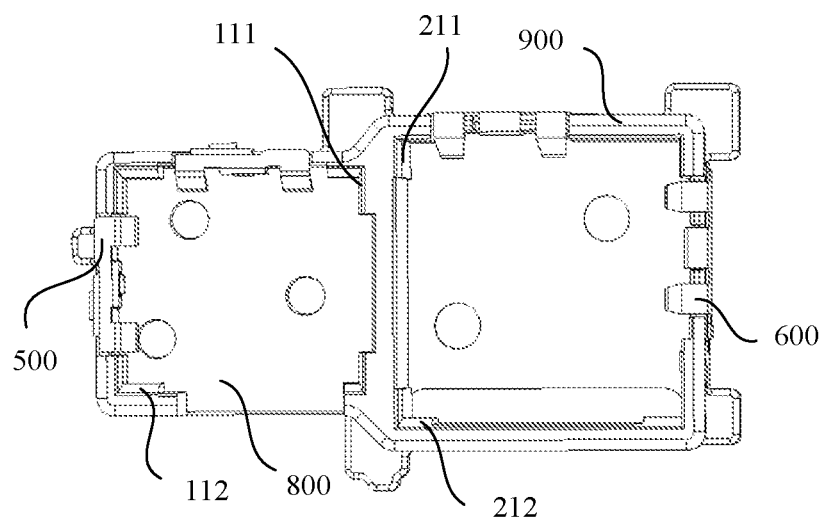
FIG. 9 is a schematic structural diagram of a positioning apparatus according to an embodiment of this application.

To improve positioning precision, a gap that is between the camera and the positioning apparatus and that is caused by a tolerance is eliminated. FIG. 5 and FIG. 6 show structures of positioning bars, and FIG. 9 shows a structure of a positioning bar on a plastic support. It can be seen from the structures shown in FIG. 5 and FIG. 6 that two protruding positioning bars 111 are disposed on the side wall 110 that is in the positioning slot 100 and that is opposite to the elastic element 500. When the camera 300 is installed in the positioning slot 100, the elastic element 500 and a corresponding positioning bar 111 separately press against the side wall 310 opposite to the camera 300. Referring to FIG. 1 and FIG. 2, when the camera 300 is installed in the positioning slot 100, the camera 300 moves in the Z direction into the positioning slot 100. After the camera 300 is in contact with the elastic element 500, the elastic element 500 is pressed. After pressing the camera 300 to continue to move in the Z direction to a specified position, the elastic element 500 pushes the camera 300 to the positioning bar 111 in the Y direction under pressure. In this case, because the elastic element 500 and the corresponding positioning bar 111 press against the camera 300, a gap that is between the camera 300 and the positioning slot 100 and that is caused by a tolerance in the Y direction can be further eliminated. This further improves positioning precision of the positioning apparatus for the camera 300.

In addition, in a manner of implementing positioning of the camera 300 by using the positioning bar 111 to cooperate with the elastic element 500, a position of the camera 300 in the positioning slot 100 may be adjusted by using the elastic element 500, and a position degree between cameras can be adjusted to an indicator range without using a jig. This ensures that positioning is quick and easy to operate. In addition, the elastic element 500 has a specific deformation range, so that the position of the camera 300 in the positioning slot 100 is not particularly fixed. Therefore, the positioning apparatus does not need to be identified based on optics, assembly of the camera 300 and the positioning slot 100 is convenient and quick, and efficiency is relatively high. Similarly, fastening in the X direction is in the same way. It can be seen from the structure shown in FIG. 11 that a plastic support 900 and a metal support 800 form the positioning slot 100 and the positioning slot 200. A positioning bar 111, a positioning bar 121, a positioning bar 211, and a positioning bar 221 are formed on a side wall of the plastic support 900. Materials of the positioning bar 111, the positioning bar 121, the positioning bar 211, and the positioning bar 221 are plastic, and hardness of the plastic is relatively small, to further reduce damage caused by the positioning bar to the camera. In addition, the positioning bar 111, the positioning bar 121, the positioning bar 211, and the positioning bar 221 are directly formed on the plastic support 900, to facilitate processing and manufacturing, and reduce manufacturing costs.

Figure 10:
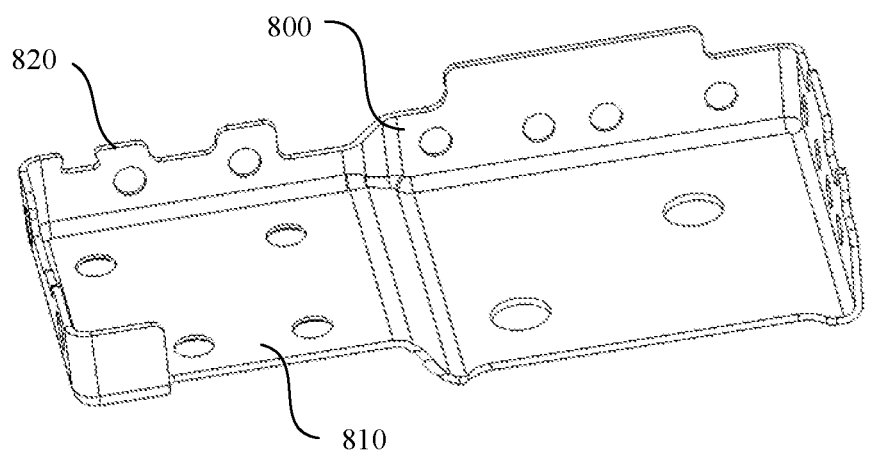
FIG. 10 is a schematic structural diagram of a metal support according to an embodiment of this application.

To improve positioning precision, FIG. 9 shows a structure of the metal support and a structure of the plastic support, and FIG. 10 shows a structure of the metal support. It can be seen from the structure shown in FIG. 11 that the body includes the metal support 800 and the plastic support 900. During processing, the metal support 800 is first formed through stamping. As shown in FIG. 10, the plastic support 900 is formed on the metal support 800 through insert injection molding. The metal support 800 and the plastic support 900 form the positioning slot 100 and the positioning slot 200, and then the elastic element 500 and the elastic element 600 are assembled on the plastic support 900 and/or the metal support 800. Referring to FIG. 1, when the camera 300 is pressed in the positioning slot 100, the elastic element 500 pushes the camera 300 on the side wall opposite to the elastic element 500 or the positioning bar opposite to the elastic element 500, to form effective positioning on the camera 300. In addition, the plastic support 900 is processed through one-time injection molding on the metal support 800, which is convenient for processing and has a relatively stable structure, and ensures position precision of the positioning slot 100 and the positioning slot 200, and position precision between the positioning slot 100 and the positioning slot 200. In addition, based on different specific requirements, the body is not limited to a metal material, a plastic material, or a combination of the metal material and the plastic material.

The following uses the body shown in FIG. 4 and FIG. 9 as an example to describe a structure when the cover plate 700 is fastened to the body. Referring to FIG. 10, the metal support 800 includes a bottom plate 810 and a side plate 820. It can be seen from the structure shown in FIG. 9 that the elastic element 500 is fastened to the side plate 820, and the cover plate 700 is detachably fastened to an outer surface of the side plate 820. It can be seen from FIG. 4 that a cross section of the cover plate 700 is L-shaped. Referring to FIG. 3, one end of the cover plate is disposed on the end face 310 of the camera 300, and the other end is fastened on the outer surface of the side plate 820. It can be seen from the structure shown in FIG. 4 that after the camera 300 is installed in the positioning slot 100, the positioning slot 100 and the elastic element 500 form effective positioning on the camera 300. The cover plate 700 is directly pressed against the end face 310 of the camera 300, or an elastic part such as foam is added between the cover plate 700 and the end face 310 of the camera 300, and then the cover plate 700 is pressed against the end face 310 of the camera 300. Then, the cover plate 700 is bonded or welded to the outer surface of the side plate 820 to form fastening of the camera 300. Movement of the camera 300 in the Z direction is limited by cooperation between the bottom plate 810 of the metal support 800 and the cover plate 700. In this way, a gap that is between the camera 300 and the positioning slot 100 and that is caused by a tolerance in the Z direction is eliminated, and a bonding or welding function between the cover plate 700 and the side plate 820 can ensure, on a basis of ensuring positioning precision, a fastening strength after the cover plate 700 is fastened to the body. The bottom plate 810 and the side plate 820 may reinforce and support the plastic support 900, and can also be electrically connected to the camera 300. The cover plate 700 and the metal support 800 are processed through one-time stamping, and the cover plate 700 and the side plate 820 of the metal support 800 are bonded or welded, to ensure position precision of the positioning slot 100 and the positioning slot 200, and position precision between the positioning slot 100 and the positioning slot 200 in the Z direction. The fastening connection between the cover plate 700 and the side plate 820 is not limited to a bonding and welding manner, and may be another manner in which the cover plate 700 and the side plate 820 can be fastened. A connection manner between the cover plate 700 and the side plate 820 may be selected based on an actual situation of the camera module.

In addition, when the camera 300 or the camera 400 needs to be grounded, an elastic element 500 of a conductive material or an elastic element 600 of a conductive material may be used. The elastic element 500 presses against the camera 300, and the elastic element 600 presses against the camera 400. In addition, the elastic element 500 is fastened in the positioning slot 100. The elastic element 600 is fastened in the positioning slot 200. Therefore, the positioning apparatus can be electrically conducted to the camera 300 and the camera 400 by using the elastic element 500 of a conductive material or the elastic element 600 of a conductive material, and the camera 300 or the camera 400 is grounded by using the positioning apparatus. The elastic element 500 and/or the elastic element 600 are/is prepared by using a stainless steel material. The elastic element 500 and/or the elastic element 600 may also be prepared by using another material that has both elastic and conductive properties. The elastic element 500 and the elastic element 600 may be prepared by using a same material, for example, may be prepared by using a stainless steel material at the same time. The elastic element 500 and the elastic element 600 may also be prepared by using two types of materials. For example, the elastic element 500 is prepared by using a stainless steel material, and the elastic element 600 is prepared by using another material that has both elastic and conductive properties.

In addition, as shown in FIG. 1 and FIG. 4, an embodiment of this application further provides a camera module. FIG. 1 shows a structure in which an elastic element in a positioning slot cooperates with a camera. FIG. 4 is a partial structure of the camera module. The camera module includes the foregoing positioning apparatus, the camera 300 disposed in the positioning slot 100 and the camera 400 disposed in the positioning slot 200. When the camera 300 and the camera 400 are assembled to the positioning apparatus, the camera 300 is locked in the positioning slot 100 by pressing the elastic element 500 against the housing 320 of the camera 300 and pressing the cover plate 700 against the end face 310 of the camera 300, to eliminate a gap that is between the camera 300 and the positioning apparatus and that is caused by a tolerance, and further improve precision of positioning the camera 300 by the positioning apparatus. In addition, when being impacted, the camera 300 is rapidly reset under an action of the elastic element 500, to improve reliability of the camera module.

In addition, an embodiment of this application further provides a mobile terminal. The mobile terminal includes a housing and the foregoing camera module disposed in the housing. The elastic element 500 and the cover plate 700 are disposed to improve positioning precision of the positioning apparatus for the camera 300, to ensure position precision and reliability of the camera module.

In addition, to facilitate processing, manufacturing, positioning, and installation, the cover plate 700 may be integrated with the housing. When the housing is prepared, a fixture used to press against the end face 310 of the camera 300 is formed on an inner surface of the housing. During assembly, the camera 300 is first installed in the positioning slot 100. The elastic element 500 cooperates with the positioning slot 100 to implement positioning of the camera 300 in the X direction and the Y direction. Then, an elastic part such as foam is disposed between the fixture and the end face 310 of the camera 300, the housing is covered on the positioning slot, and finally the fixture presses against the end face 310 of the camera 300, to implement positioning of the camera 300 in the Z direction.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A positioning apparatus, comprising:
a body having a positioning slot used to accommodate a camera and a plurality of elastic elements respectively fastened to two side walls adjacent to the positioning slot;
a cover plate fastened to the body, wherein when the camera is installed in the positioning slot, two of the elastic elements separately press against a housing of the camera, and the cover plate presses against an end face of the camera; and
a positioning bar disposed on a side wall that is in the positioning slot and opposite to each of the two elastic elements.

2. The positioning apparatus according to claim 1, wherein each of the elastic elements comprises:
an elastic position-limiting part located in the positioning slot; and
a connection part, wherein the connection part is fastened to a side wall of the positioning slot.

3. The positioning apparatus according to claim 2, wherein the elastic position-limiting part comprises two spring sheets, one end of each spring sheet is connected to the connection part, and the other end of each spring sheet extends into the positioning slot.

4. The positioning apparatus according to claim 2, further comprising:
a clamping slot disposed on the connection part; and
a protrusion clamped with the clamping slot disposed on the side wall of the positioning slot.

5. The positioning apparatus according to claim 1, wherein when the camera is installed in the positioning slot, an elastic element of the two elastic elements and a corresponding positioning bar separately press against a side wall opposite to the camera.

6. The positioning apparatus according to claim 1, wherein the body comprises a metal support and a plastic support that is formed on the metal support through insert injection molding, and the metal support and the plastic support form the positioning slot.

7. The positioning apparatus according to claim 6, wherein the metal support comprises a bottom plate and a side plate, each elastic element is fastened to the side plate, and the cover plate is detachably fastened to an outer surface of the side plate.

8. The positioning apparatus according to claim 6, further comprising a positioning bar disposed in the positioning slot and formed on a side wall of the plastic support.

9. The positioning apparatus according to claim 1, wherein each elastic element is formed using a conductive material.

10. The positioning apparatus according to claim 9, wherein each elastic element is formed using a stainless steel material.

11. A mobile terminal, comprising:
a positioning apparatus, including
a body having a positioning slot to accommodate a camera,
a plurality of elastic elements respectively fastened to two side walls adjacent to the positioning slot,
a cover plate fastened to the body, wherein when the camera is installed in the positioning slot, two of the elastic elements separately press against a housing of the camera and the cover plate presses against an end face of the camera; and
a positioning bar disposed on a side wall that is in the positioning slot and opposite to each of the two elastic elements; and
a housing housing the positioning apparatus.

12. The mobile terminal according to claim 11, wherein each elastic element comprises:
an elastic position-limiting part located in the positioning slot; and
a connection part, wherein the connection part is fastened to a side wall of the positioning slot.

13. The mobile terminal according to claim 12, wherein the elastic position-limiting part comprises two spring sheets, one end of each spring sheet is connected to the connection part, and the other end of each spring sheet extends into the positioning slot.

14. The mobile terminal according to claim 12, wherein the positioning apparatus further comprises a clamping slot disposed on the connection part and a protrusion clamped with the clamping slot disposed on the side wall of the positioning slot.

15. The mobile terminal according to claim 12, wherein the connection part is bonded or welded to the side wall of the positioning slot.

16. The mobile terminal according to claim 11, wherein when the camera is installed in the positioning slot, an elastic element of the two elastic elements and a corresponding positioning bar separately press against a side wall opposite to the camera.

17. The mobile terminal according to claim 11, wherein the body comprises a metal support and a plastic support that is formed on the metal support through insert injection molding, and the metal support and the plastic support form the positioning slot.

18. The mobile terminal according to claim 17, wherein the metal support comprises a bottom plate and a side plate, the elastic element is fastened to the side plate, and the cover plate is detachably fastened to an outer surface of the side plate.

19. The mobile terminal according to claim 17, wherein the positioning apparatus further comprises a positioning bar disposed in the positioning slot, wherein the positioning bar is formed on a side wall of the plastic support.

20. The mobile terminal according to claim 11, wherein the elastic element is formed using a conductive material.

* * * * *